(12) United States Patent
Zhang et al.

(10) Patent No.: US 8,554,029 B2
(45) Date of Patent: Oct. 8, 2013

(54) THROUGH-BORE FIBER OPTIC SLIPRING

(75) Inventors: Hong Zhang, Pennington, NJ (US);
Boying B. Zhang, Pennington, NJ (US);
Louis D. Violante, Pennington, NJ (US)

(73) Assignee: Princetel, Inc., Hamilton, NJ (US)

( * ) Notice: Subject to any disclaimer, the term of this patent is extended or adjusted under 35 U.S.C. 154(b) by 245 days.

(21) Appl. No.: 13/111,444

(22) Filed: May 19, 2011

(65) Prior Publication Data

US 2012/0020615 A1  Jan. 26, 2012

Related U.S. Application Data

(60) Provisional application No. 61/365,977, filed on Jul. 20, 2010.

(51) Int. Cl.
*G02B 6/26* (2006.01)
*G02B 6/42* (2006.01)

(52) U.S. Cl.
USPC .......................................................... 385/26

(58) Field of Classification Search
USPC ............................................................ 385/26
See application file for complete search history.

(56) References Cited

U.S. PATENT DOCUMENTS

| | | | |
|---|---|---|---|
| 4,124,272 A | 11/1978 | Henderson et al. | |
| 5,039,193 A | 8/1991 | Snow et al. | |
| 5,157,745 A | 10/1992 | Ames | |
| 5,271,076 A | 12/1993 | Ames | |
| 5,633,963 A | 5/1997 | Rickenbach | |
| 5,949,929 A | 9/1999 | Hamm | |
| 6,301,405 B1 | 10/2001 | Keil | |
| 7,239,776 B2 * | 7/2007 | Oosterhuis et al. | 385/25 |
| 8,355,607 B2 * | 1/2013 | Zhang et al. | 385/26 |

* cited by examiner

*Primary Examiner* — Daniel Petkovsek

(57) ABSTRACT

The present invention is a limited rotation through-bore optical slip ring. This will enable one or more optical signals to pass across a rotational interface while leaving a center bore free. The present invention is passive, unlike many off axis or through bore optical slip rings and is low loss by nature.

9 Claims, 3 Drawing Sheets

THROUGH-BORE FIBER OPTIC SLIPRING

This application claims priority of U.S. Provisional Patent Application No. 61/365,977, filed date: Jul. 20, 2010.

BACKGROUND OF THE INVENTION

The present invention relates generally to the field of apparatus for fiber optic communication, and more particularly, to through-bore fiber optic slip ring to provide transmission of an optical signal through a mechanically rotational interface with a through-bore.

An optic device to transmit optic signal from a rotating member to a stationary member is called fiber optic rotary joint, or fiber optic slip ring. There are many different types of fiber optic rotary joint, or fiber optic slip ring. Fiber optic rotary joint, or fiber optic slip ring are generally categorized as either an on-axis or an off-axis. In an on-axis fiber optic rotary joint the optic signal occupies the central space along the axis of rotation. In an off-axis type, the central space along the rotational axis is not accessible and the optic signal would not be allowed to path through this central space along the rotational axis. Usually there is a through bore along the rotational axis to provide routing space for hydraulics, pneumatics, RF, or other physical media. So the off-axis fiber optic sip ring is also called through-bore fiber optic slip ring. Application examples of through-bore fiber optic slip ring, include CT scan, MRI scan, tank turret, marine propulsion systems, helicopters, machine tools, and winches. While some of these applications require an infinite number of rotations in both directions others, such as a winch, only require a limited number of rotations in either direction.

Most of the single channel on-axis fiber optic rotary joint need two relatively rotatable members to hold two ends of optical fibers, one on each side of the rotating interface, that are opto-mechanically aligned along the common rotational axis. By employing the expanded beam technology, the light beam from the fiber is expanded when it is coupled through the rotational interface. The light beam is then refocused and aligned with the receiving fiber. The details are described in U.S. Pat. Nos. 5,039,193, 4,124,272, 5,633,963, and 5,949,929.

Most of multi channel on-axis fiber optic rotary joints also include two relatively rotatable members to hold two bundles of optic fibers, one on each side of the rotating interface, which are mechanically arranged around the common rotational axis. By using the expanded beam technology and de-rotating technology, like a Dove Prism, the light beams from fiber bundles can be transmitted through the rotational interface. The details are described in U.S. Pat. Nos. 6,301,405, 5,157,745 and 5,271,076.

DESCRIPTION OF THE INVENTION

Figure 1:
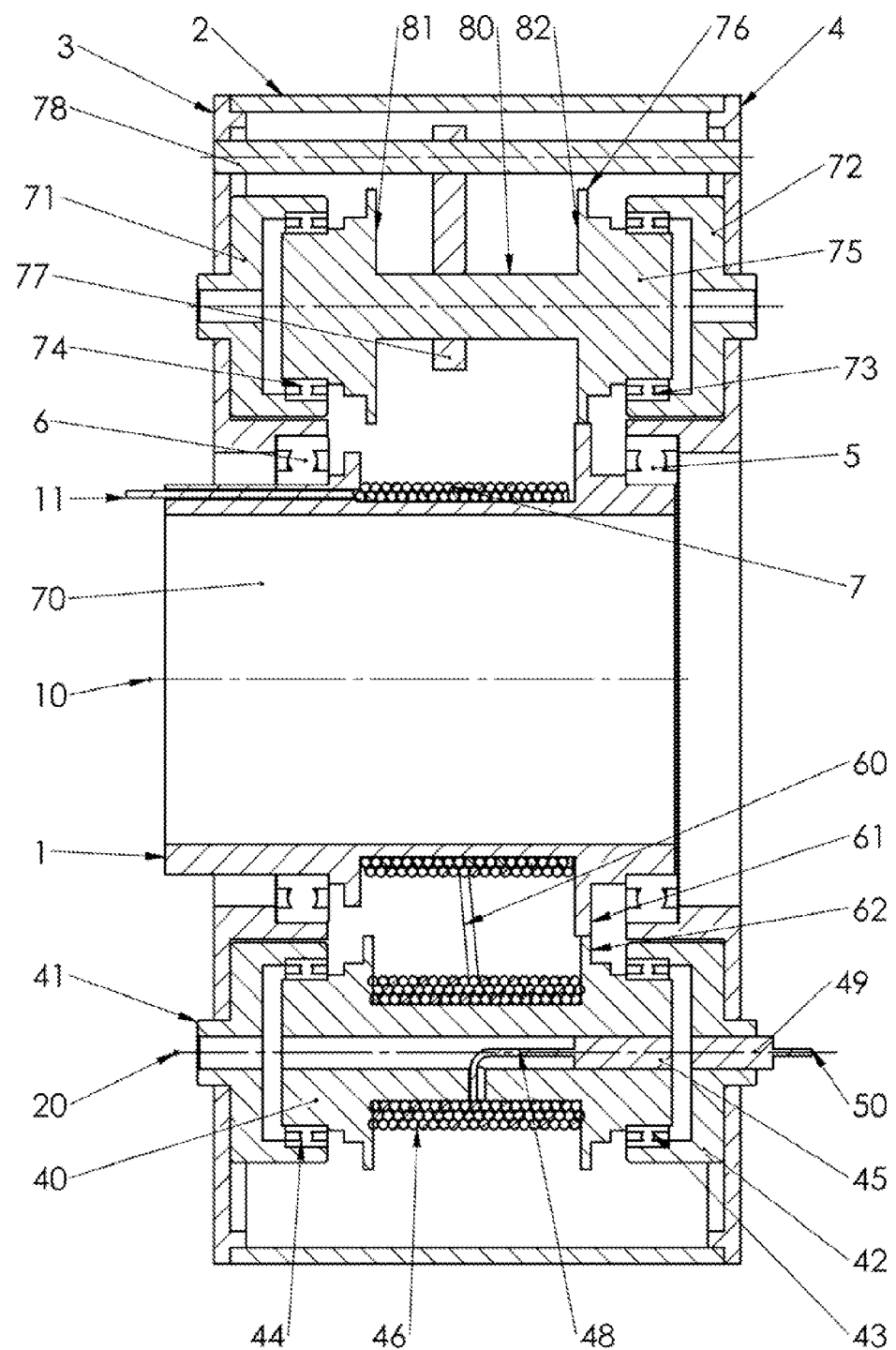
FIG. 1 shows a cross section view of the mechanical embodiment of a preferred embodiment of an through-bore fiber optic slip ring of present invention.

As shown in FIG. 1, a preferred embodiment of an through-bore fiber optic slip ring in the present invention comprises a rotor spool (1), a off-axis spool (40), housing members (2), (3), and (4), a control rotor (75), a slider (77), a rod (78), on-axis fiber optic rotary joint members (45) and (49), bearings, (5), (6), (73), (74), (43) and (44), optic fibers, or optic cables, (11) and (50).

The rotor spool (1), which has an axial through bore (70), includes two flanges, facing each other that are separated by a cylindrical barrel (7). An optical fiber (11) stored on the rotor spool (1) is wound around the barrel (7). The rotor spool (1) is mounted within the housing members (2), (3), and (4) through a pair of bearings (5) and (6) so that the rotor spool is rotatable relative to the housing members (2), (3), and (4).

The off-axis spool (40) includes two flanges, facing each other that are separated by a cylindrical barrel (46). The optical fiber (11) stored on the off-axis spool (40) is wound around the barrel (46). The off-axis spool (40) is supported by a pair of bearings (43) and (44) between holders (41) and (42), which are secured in the housing members (2), (3), and (4). The rotational axes (10) of the rotor spool (1) and (20) of the off-axis spool (40) are parallel each other.

Gears (61) and (62) are integrated into one of the flanges on rotor spool (1) and one of the flanges on off-axis spool (40) respectively. The gear (61) and (62) are engaged with each other and are selectively designed so that the off-axis spool (40) would rotate in a reverse direction as that of the rotor spool (1).

A single channel on-axis fiber optic rotary joint has a rotor member (45) and stator member (49), which is secured in the central area of the off-axis spool (40) and the central area of one of the holder (42) or (41). The optical signal can be transmitted through the rotational interface between the off-axis spool (40) and the holder (42) or (41).

The control rotor (75) is supported by bearing (73) and (74) and is rotatable by the engagement of gear (76) and gear (61). In the middle portion of the control rotor (75) is the ball screw (80), which drives slider (77) to move along rod (78). There are two surfaces (81) and (82) on the control rotor (75). If the slider (77) contact with either surfaces (81) or (82), it would make the whole system stop moving. The pitch of ball screw (80) and the distance between surfaces (81) and (82) should be determined by the total fiber length used in the system. Different application may requires different fiber lengths.

Figure 2:
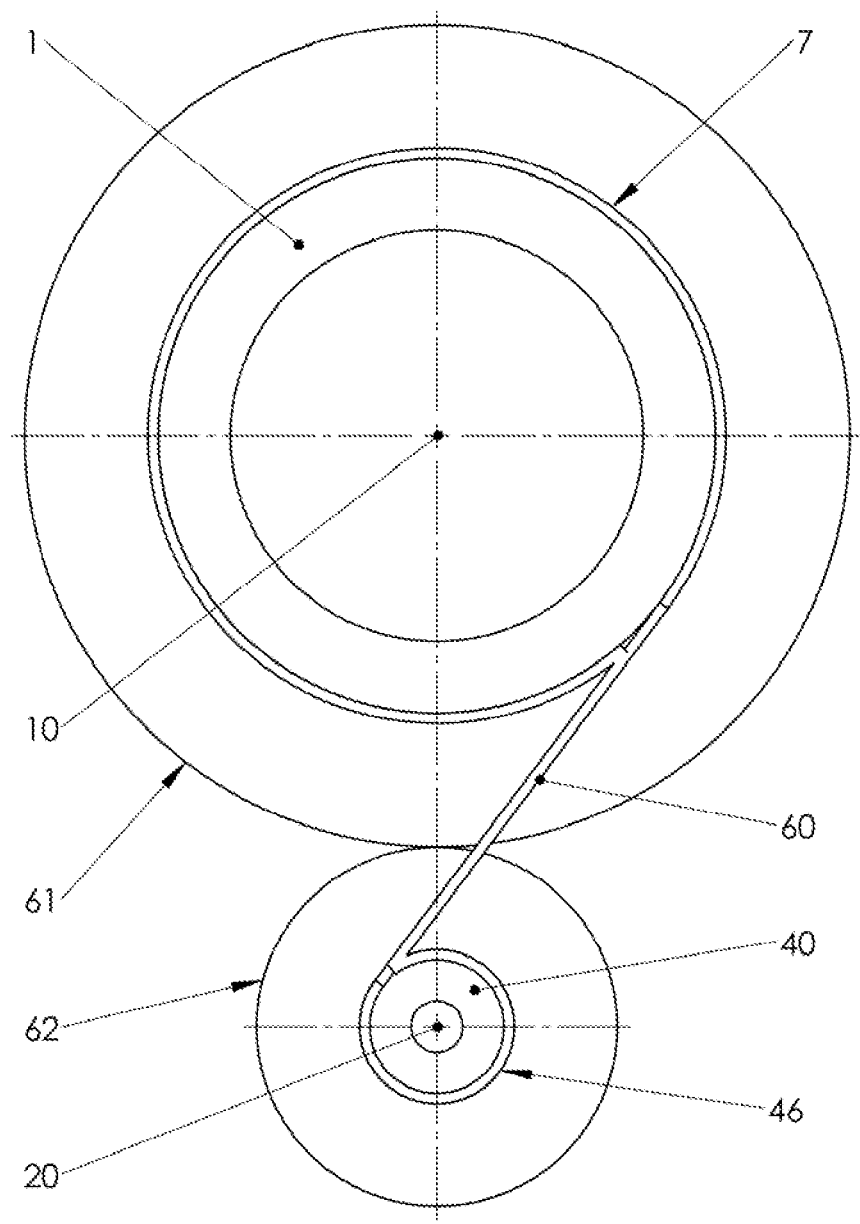
FIG. 2 illustrates how the optical fiber (11 in FIG. 1) is wound around the rotor spool (1) and the off-axis spool (40)

FIG. 2 illustrates how the optical fiber (11 in FIG. 1) is wound around the rotor spool (1) and the off-axis spool (40).

It is to be understood that the size of the optical fiber relative to barrels (7) and (46) is somewhat exaggerated for better illustrating the effects upon the optical fiber as its being wound on and off barrels (7) and (46).

Without loss of generality we shall assume the optical fiber is wound around the barrel (7) in clockwise direction for a couple of layers. Then after a straight section (60) of the fiber it is wound around barrel (46) in counterclockwise direction. The fiber end of the optical fiber is secured to the rotor member (45 in FIG. 1) of an on-axis fiber optic rotary joint.

So when the rotor (1) rotates clockwise the off-axis spool (40) would rotate counter-clockwise due to the engagement of gears (61) and (62). The optic signal would go through the optical fiber to the rotor member of on-axis fiber optic rotary joint, into the stator member (49 in FIG. 1), then exit from optical fiber (50 in FIG. 1). If the signal were to originate in other optical fiber (50 in FIG. 1) then the signal would travel the same path but in reverse.

Figure 3:
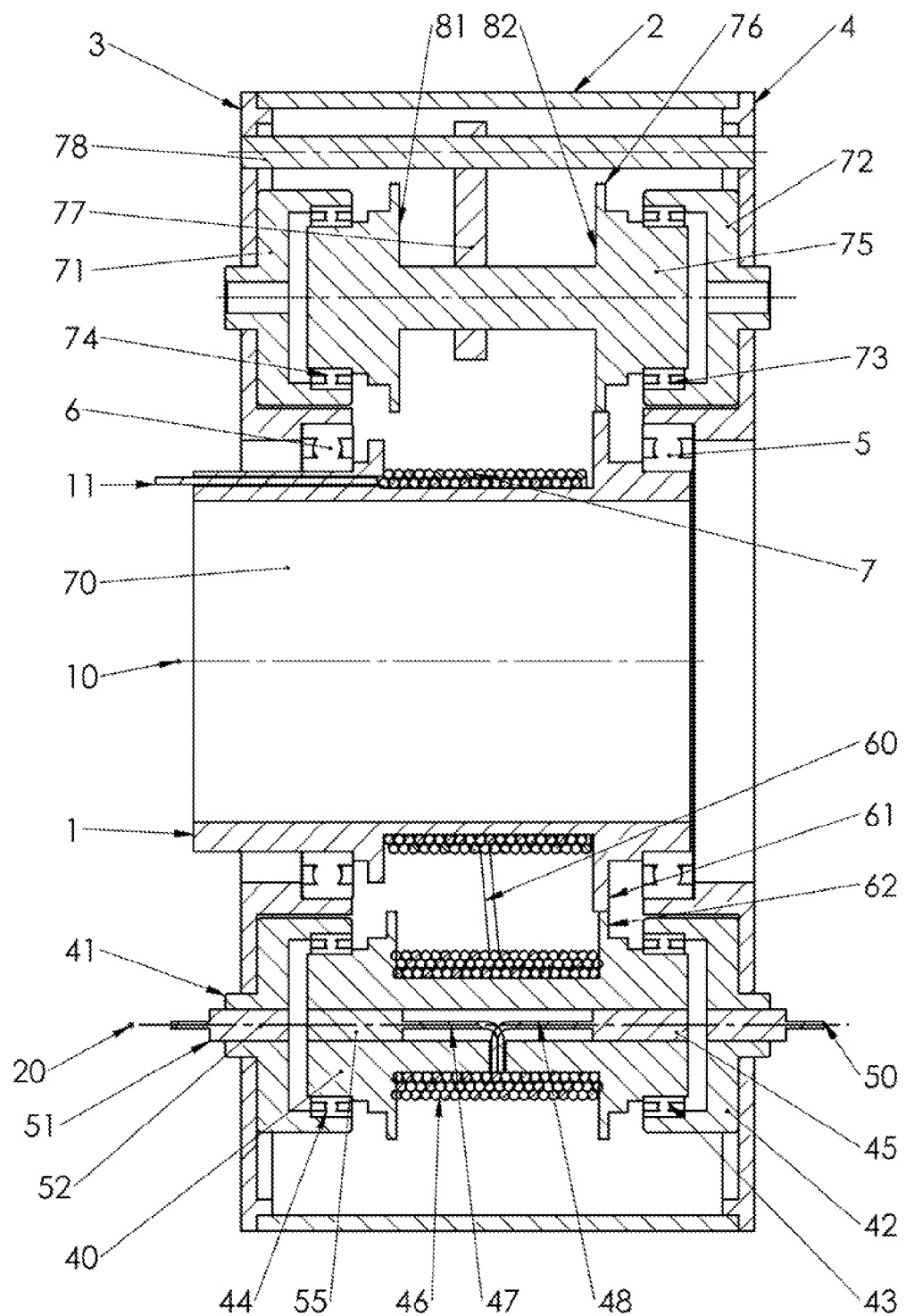
FIG. 3 is a cross section view of another preferred embodiment of a through-bore fiber optic slip ring.

Another preferred embodiment of a through-bore fiber optic slip ring in the present invention is illustrated in FIG. 3. It is a two-channel through-bore fiber optic slip ring, in which the fiber cable (12) includes 2 fibers (47) and (48). The fiber cable (12) is wound around the rotor spool (1) and the off-axis spool (40) in the same way as the optical fiber (11 in FIG. 1)

shown in FIG. 2. The second single channel on-axis fiber optic rotary joint has a rotor member (55) and stator member (52), which is secured in one side of the central area of the off-axis spool (40) and the central area of one of the holder (41). The optical signals can be transmitted from the fiber cable (12) to the rotor members (45) and (55) through fibers (47) and (48), then coupled into the stator members (49) and (52) and exit from fibers (50) and (51).

Obviously the continuous bi-directional rotation of rotor (1) relative to housing (2) is limited by the length of fiber (11 in FIG. 1), or the fiber cable (12 in FIG. 3).

The above-described embodiments of the present invention can be modified by replacing the single fiber with a fiber bundle and using any multi channel on-axis fiber optic rotary joint to replace the single channel on-axis fiber optic rotary joint in FIG. 1, or FIG. 2 to achieve a multi-channel through-bore fiber optic slip ring, in which the fiber cable 12 would include multi-fibers and at the rotational interface between (45) and (49) or between (52) and (55), there would be a de-rotating mechanism.

We claim:

1. A single channel bi-directional limited rotation through-bore optical slip ring comprising:
   a rotor spool with a first gear;
   an off axis spool with a second gear;
   a control rotor with a third gear, wherein the control rotor is coupled to the rotor spool via at least one gear;
   a plurality of housing members;
   the first and the second gears are selectively designed so that the off axis spool rotates in the reverse direction of the rotor spool; and
   an on axis single channel fiber optic rotary joint with a first optical fiber and a second optical fiber; wherein the first fiber is coupled to the fiber mounted on the rotor spool and the second optical fiber forms the stator side input/output fiber for the bi-directional limited rotation off axis rotary joint; wherein the second optic fiber, wound around the barrel of the rotor spool in one direction, is running over to the off-axis spool and wound in the opposite direction and further connected to said on axis single channel fiber optic rotary joint.

2. The single channel bi-directional limited rotation through-bore optical slip ring of claim 1, wherein the control rotor further comprising a ball screw and a slider engaged with the rotor spool via gears; and the control rotor rotating the ball screw that moves the slider from side to side on the barrel, depending on the direction of rotation, until it is stopped by the bottom or the top surface on the barrel and creates a firm stop preventing over rotation of the joint.

3. The single channel bi-directional limited rotation through-bore optical slip ring of claim 1, wherein the on axis single channel fiber optic rotary joint is mounted on the off axis spool.

4. A two channel bi-directional limited rotation through-bore optical slip ring comprising:
   a rotor spool with a first gear;
   an off axis spool with a second gear;
   a control rotor with a third gear, wherein the control rotor is coupled to the rotor spool via at least one gear;
   a plurality of housing members;
   the first and the second gears are selectively designed so that the off axis spool rotates in the reverse direction of the rotor spool; and two on axis single channel fiber optic rotary joints each with a first optical fiber and a second optical fiber and both rotary joints having the first optical fiber coupled to one of the fibers mounted on the rotor spool, wherein the second optical fiber on each fiber optic rotary joint forms the stator side input/output fibers for the bi-directional limited rotation through-bore optical slip ring; wherein the first and the second optical fibers are bound together then wound around the barrel of the rotor spool in one direction, run over to the off-axis spool and wound in the opposite direction, then they are split apart and each connected to a different on axis single channel fiber optic rotary joint.

5. The two channel bi-directional limited rotation through-bore optical slip ring of claim 4, wherein the control rotor comprising a ball screw and a slider engaged with the rotor spool via gears; wherein the control rotor rotates the ball screw that moves the slider from side to side on the barrel, depending on the direction of rotation, until it is stopped by the bottom or the top surface on the barrel and preventing over rotation of the joint.

6. The two channel bi-directional limited rotation through-bore optical slip ring of claim 4, wherein two on axis single channel fiber optic rotary joints are mounted on said off axis spool.

7. A multiple channel bi-directional limited rotation off axis rotary joint comprising:
   a rotor spool with a first gear;
   an off axis spool with a second gear;
   a control rotor with a third gear, wherein the control rotor is coupled to the rotor spool via at least one gear;
   a plurality of housing members;
   and the first and the second gears are selectively designed so that the off axis spool rotates in the reverse direction of the rotor spool; an on axis multiple channel fiber optic rotary joint with a first optical fiber bundle and a second optical fibers bundle, the first fiber bundle is coupled to the fiber bundle mounted on the rotor spool and the second optical fiber bundle forms the stator side input/output fiber bundle for the bi-directional limited rotation off axis rotary joint, wherein the second optical fiber bundle is wound around the barrel of the rotor spool in one direction and runs over to the off-axis spool and wound in the opposite direction then is connected to the on axis multiple channel fiber optic rotary joint.

8. The multiple channel bi-directional limited rotation off axis rotary joint of claim 7; wherein the control rotor further comprising a ball screw and a slider engaged with the rotor spool via gears; wherein the control rotor rotates the ball screw that moves the slider from side to side on the barrel, depending on the direction of rotation, until it is stopped by the bottom or the top surface on the barrel.

9. The multiple channel bi-directional limited rotation off axis rotary joint of claim 7, wherein an on axis multi channel fiber optic rotary joint is mounted on said off axis spool.

* * * * *